United States Patent [19]

Trahan

[11] Patent Number: 4,498,563

[45] Date of Patent: Feb. 12, 1985

[54] WIRELINE CATCHER

[76] Inventor: Wilson J. Trahan, Rte. 2, Box 54-A, Scott, La. 70583

[21] Appl. No.: 410,517

[22] Filed: Aug. 23, 1982

[51] Int. Cl.[3] .................................................. B60T 7/12

[52] U.S. Cl. .................................. 188/65.1; 188/188; 242/107.2

[58] Field of Search ...................... 188/65.1, 110, 136, 188/188, 189; 242/84.52 A, 107.2, 107.3

[56] References Cited

U.S. PATENT DOCUMENTS

| | | | |
|---|---|---|---|
| 2,970,445 | 2/1961 | Suderow | 188/189 X |
| 2,991,526 | 7/1961 | Kuebler | 24/126 |
| 3,049,775 | 8/1962 | Ondeck | 24/126 |
| 3,335,469 | 8/1967 | Shand et al. | 24/126 |
| 3,467,224 | 9/1969 | Curtis et al. | 188/65.1 |
| 3,472,343 | 10/1969 | Williams et al. | 188/65.1 |
| 3,706,361 | 12/1972 | Paulssen et al. | 188/189 |
| 3,779,347 | 12/1973 | Chevalier | 188/65.2 |
| 3,957,118 | 5/1976 | Barry et al. | 166/315 |

*Primary Examiner*—Duane A. Reger
*Attorney, Agent, or Firm*—Charles C. Garvey, Jr.

[57] ABSTRACT

An oil well wireline cable catcher apparatus includes a housing having a bore which passes vertically therethrough so that a wireline can pass vertically therethrough and then into the oil well bore. Sensing means are also included to monitor tension of the wireline. Slips are disposed within the housing on opposite sides of the wireline between gripping and retracted positions. Each slip has a wireline engaging surface, the pair of respective surfaces facing one another so as to grip the wireline when the slips are actuated to the gripping position. A pair of springs mounted in the housing are respectively beneath each slip, the springs biasing the slips toward the retracted position so that the wireline is not engaged by the slip surfaces. A slip actuator means is carried by the housing and is cooperatively connected to the sensing means for moving the slips together to grip the wireline responsive to a break in the wireline and attentive relaxation in wireline tension.

6 Claims, 15 Drawing Figures

WIRELINE CATCHER

BACKGROUND OF THE INVENTION

1. Technical Field

The present invention relates to the oil and gas well drilling, exploration, and production industry. More particularly, the present invention relates to wireline catchers which sense a decrease in wireline tension resulting from a snap, break or any other decrease in tension and responsive thereto catch the line and prevent it from falling into the well bore resulting in a loss of the line and anything attached thereto.

2. General Background

Various devices are known which have been directed to the problem of preventing the falling of a wireline device into a well bore responsive to a break in the line. See, for example, U.S. Pat. No. 3,779,347 entitled "Cable Catcher" issued to Arthur A. Chevalier. In that patent, various other attempts at wireline catchers and/or cable clamping devices and/or grabbing devices are discussed. For example, Marshall provides an early patent (U.S. Pat. No. 1,338,780) which discloses a rope grabbing device to be used as a portable fire escape. Another U.S. Pat. No. (3,179,994) discusses a cable breaking mechanism designed to support a workman physically attached to a vertical cable at an elevated distance.

U.S. Pat. No. 3,467,224 issued to W. L. Curtis, et al, is entitled "Cable Safety Clamping Device for Oil Wells and the Like." In that patent there is provided a housing body having an aperture extending therethrough. The cable to be clamped is normally occupying the aperture. Slips are disposed in a slip way and an actuating device is provided for engaging the slips into the cable when the cable breaks. Fluid pressure is used to move the slips both into and out of engagement with the cable. In order to accomplish the fluid pressure actuation of the slips, upper and lower pistons which are fluid activated bear on the slips themselves.

U.S. Pat. No. 2,991,526 entitled "Scenery Handling Apparatus" was issued to J. F. Kuebler and is a crude example of a type of cable catching device used with rope.

3. General Discussion of the Present Invention

The present invention provides a wireline catching device which comprises a housing having an axial opening through the central portion of the housing which is occupied during operation by a wireline as it descends downwardly toward the well bore. Within the housing body are provided slips which are movable between gripping and retracted positions.

A tripping mechanism in the form of a sheave attached to the wireline is provided, with the slips engaging responsive to breaking of the wireline and a releasing of tension on the sheave. A pair of coil springs normally bias the slips to the retracted position. Pneumatic pressure applied to the slips by means of a ram pushrod actuates the slips.

In the preferred embodiment, releasing of the trip sheave causes a shift in position of an attached pushrod which re-directs and regulates pneumatic pressure from a re-circulating or dormant position to a position which causes the beveled surfaces to engage the slips and press them into position. The invention as disclosed provides an extremely fast reacting and dependable wireline catcher which can catch a broken wireline within a few inches of wireline length after the break occurs.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
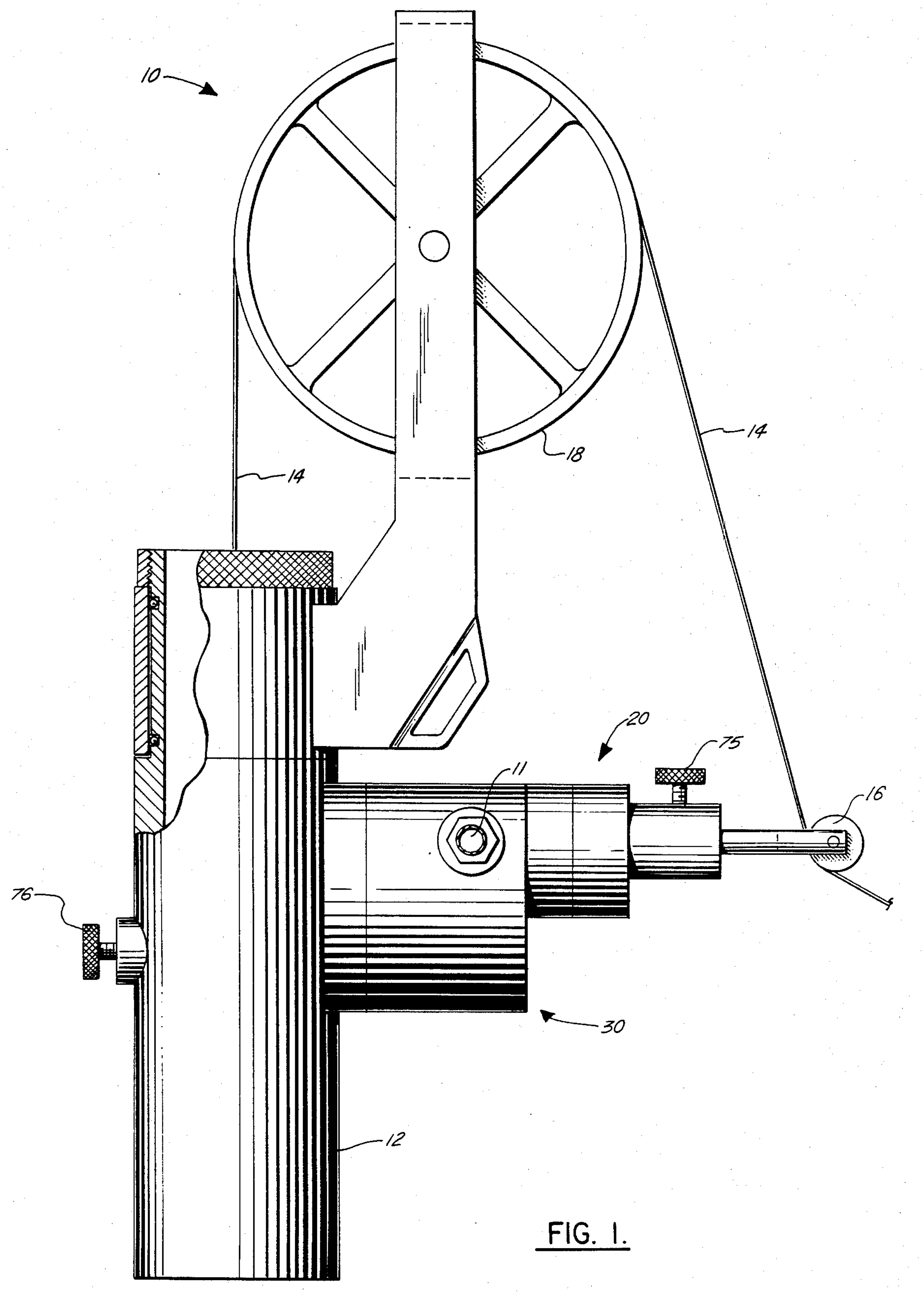
FIG. 1 is a side view of the preferred embodiment of the apparatus of the present invention.
Figure 2:
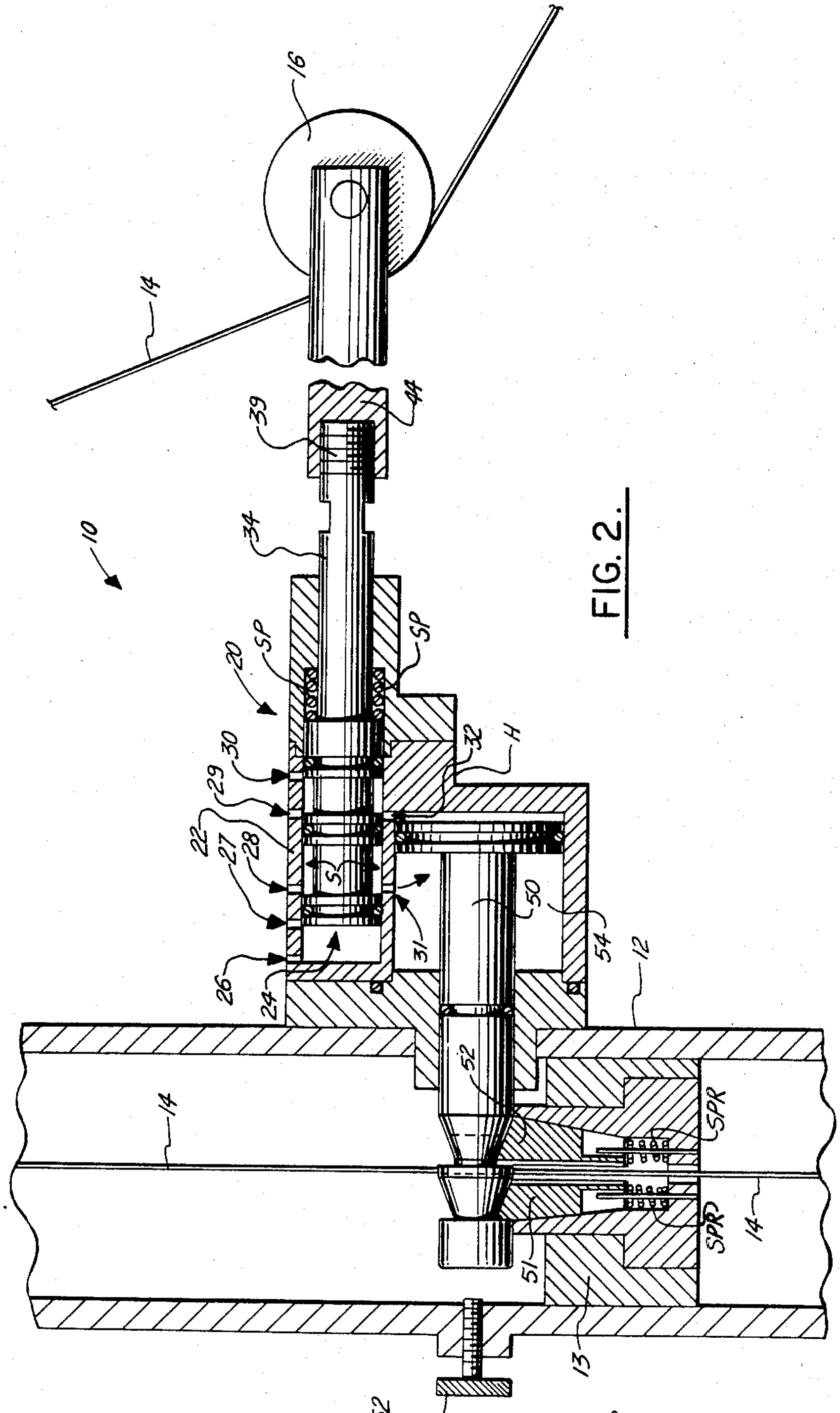
FIG. 2 is a fragmentary, side sectional view of the preferred embodiment of the apparatus of the present invention.

FIGS. 1 and 2 show generally the preferred embodiment of the apparatus of the present invention designated generally by the numeral 10. In FIGS. 1 and 2 there can be seen wireline catcher 10 having a housing 12 through which a wireline 14 passes vertically. It will be understood by one skilled in the art that wireline catcher 10 will be supported generally atop a supporting structure so that the wireline coming from a supply reel passes through any desired supporting structures or sheaves and then through sheave 16 and thereafter sheave 18, then vertically through the tool body 12.

A pair of sheaves 16, 18 are seen in FIG. 1. Sheave 16 comprises a portion of the trigger 20 assembly for the apparatus 10 as will be described more fully hereinafter. When the wireline 14 breaks, sheave 16 is released, as will be described more fully with respect to FIG. 6, so that the wire line and any attachments thereto are prevented from plunging into the well bore.

A second sheave 18 supports wireline 14 as it passes upwardly from a supplying spool, for example, through sheave 16 and then changes direction to proceed downwardly into the well bore.

Trigger mechanism 20 comprises in part sheave 16 and can also been seen in FIG. 2. Trigger assembly 20 includes an elongated shaft 34 which is threadably attached at one end portion to sheave 16 and at its other end portion moves within housing H in a provided annular sleeve 24 surrounded by wall 22.

Figure 6:
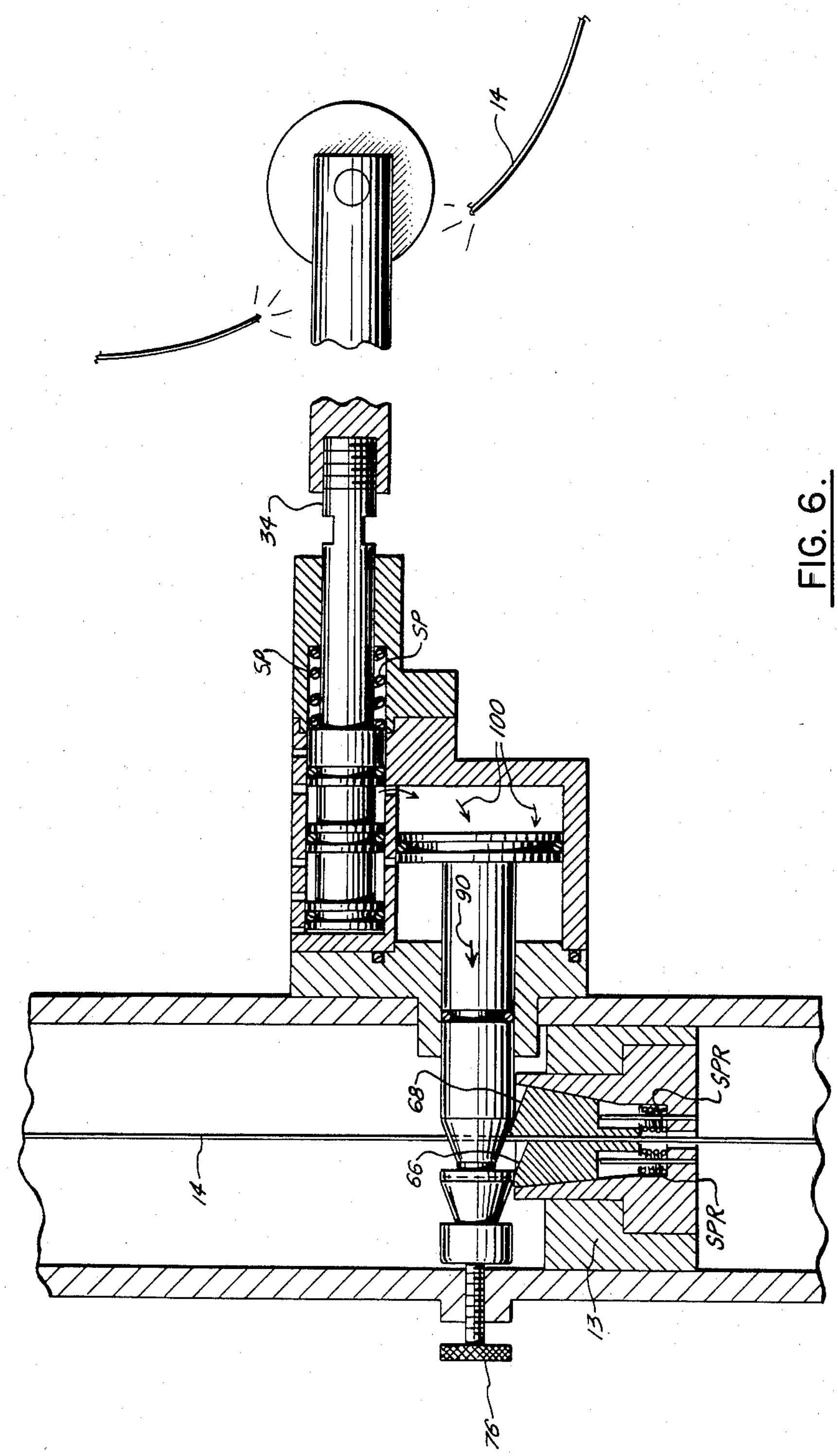
FIG. 6 is a side, sectional fragmentary view of the preferred embodiment of the apparatus of the present invention illustrating engaging of the slips responsive to a breaking of the wireline.

A plurality of sleeve openings 26–32 are also seen in FIG. 2. These openings are alternatively opened and blocked so as to circulate pneumatic fluid. An air intake 11 is seen in FIG. 1 which normally communicates with the space S sealed off between annular ribs 36 and 37 (FIGS. 9–10) of shaft 34. Three enlarged diameter annular ribs 35–37 are provided on shaft 34. Each of the ribs provides an annular recess 38 which is normally occupied by an O-ring which are shown in the drawings in FIG. 1. When wireline 14 breaks, tension is relieved upon sheave 16, allowing it to move in laterally responsive to urging by spring SP. This shifts shaft 34 until its lateral travel is stopped by threaded bolt 75 hitting slot 40 of shaft 34. At that time pneumatic fluid applied at 11 will enter space S and then dispense through opening 32 into sleeve 54 (see arrows 100-FIG. 6) so as to urge slip ram-type actuator 50 in the direction of arrow 90 which engages the slips. It should be understood that opening 11 can be supplied with a detachable connection for attaching a common pneumatic air hose thereto. Such a detachable connection is a common commercially available item. Also, it should be understood that opening 11 is in a fixed position on housing 11, but communicates with sleeve 24 at space S. In the position of FIG. 2, space S is pressurized and is that space between ribs 35 and 36. The O-rings of FIG. 2, disposed within recesses 38 of these ribs 35, 36 for a seal. In this position, pneumatic pressurized fluid can enter sleeve 54 through opening 31 and pressurize that space within sleeve 54, the pressure, aiding to hold ram 50 in a retracted position as shown. However, when line 14 breaks, spring SP shifts rod 34 to the position of FIG. 6. Now, the space S between ribs 36 and 37 pressurized and fluid is routed to opening 32 so that ram 50 moves laterally as shown in FIG. 6. The openings 28, 29 are created during manufacture and would normally be closed by a threaded plug, for example.

FIGS. 7 through 10 show more particularly the construction of trigger shaft 34 and slip actuator 50.

Figure 9:
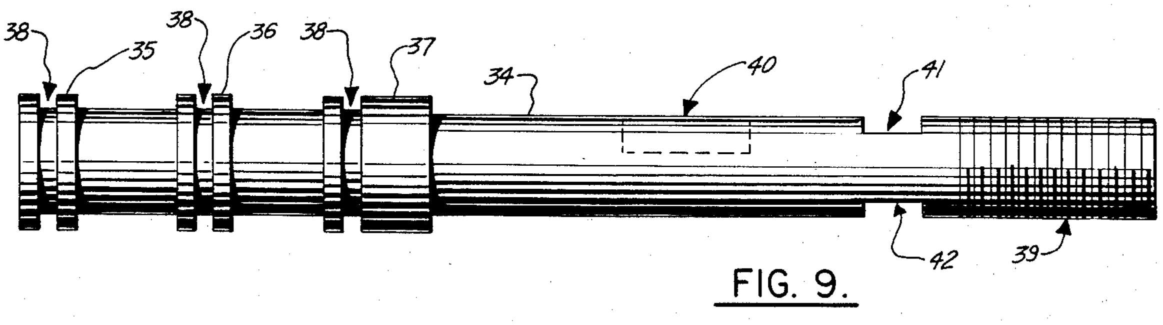
FIG. 9 is a side view of the trigger rod assembly portion of the preferred embodiment of the apparatus of the present invention.
Figure 10:
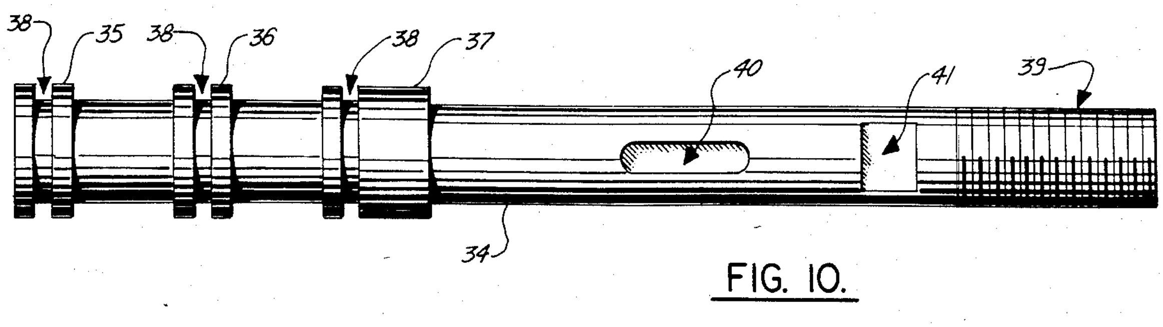
FIG. 10 is a top view of the trigger rod assembly portion of the preferred embodiment of the apparatus of the present invention.

FIGS. 9 and 10 show more particularly the construction of trigger rod assembly 34, providing at one end portion a threaded end 39 which communicates with and attaches to sheave carrier 44 (see FIG. 2). A slot 40 is provided which is receptive of threaded bolt member 75. The combination of member 75 and slot 40 maintains the desired rotational position of shaft 34 within sleeve 24.

The end portion of shaft 34 opposite threaded portion 39 provides ribs 35–37, each of which has an annular groove 38 receptive of an O-ring. O-rings can be schematically seen in the drawing in FIG. 2, each disposed within recess 38.

Flattened portions 41, 42 allow shaft 34 to be rotated as, for example, to effect threaded adjustment and/or disassembly with sheave carrier 44.

Figure 7:
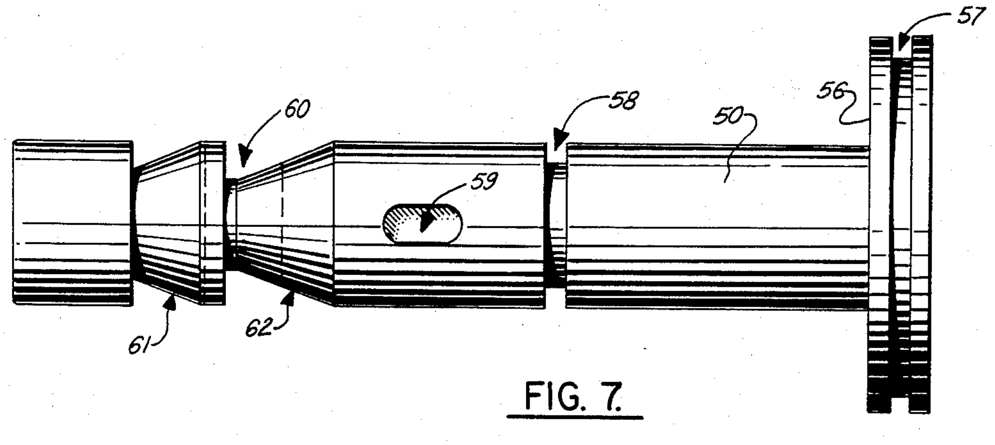
FIG. 7 is a side view of the slip ram portion of the preferred embodiment of the apparatus of the present invention.
Figure 8:
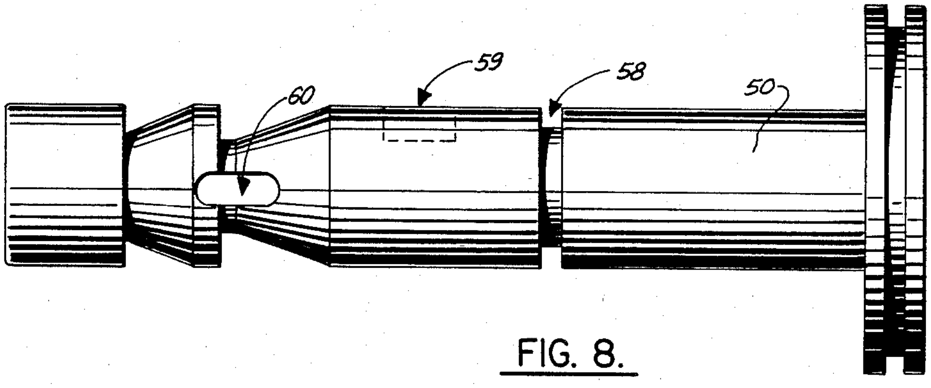
FIG. 8 is a top view of the slip ram portion of the preferred embodiment of the apparatus of the present invention.

FIGS. 7 and 8 show more particularly slip actuator 50. One end portion of slip actuator 50 has attached thereto annular disk 56. Disk 56 would preferably be round and of a diameter substantially the same as or slightly smaller than the diameter of annular sleeve chamber 54. Disk 56 could be provided with an annular recess 57 so that an O-ring could be placed therein as is shown in FIG. 2 of the drawings.

Figure 3:
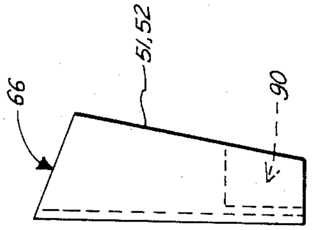
FIG. 3 is a schematic, side view of a slip portion of the preferred embodiment of the apparatus of the present invention.
Figure 4:
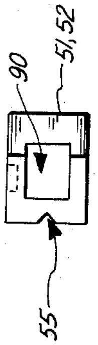
FIG. 4 is a bottom view of the slip element of FIG. 3.
Figure 5:
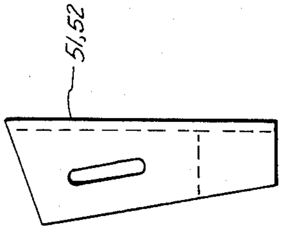
FIG. 5 is another side view of the slip of FIGS. 3 and 4.

Likewise recess 58 provides a place for the attachment of an O-ring. A slot 59 on actuator 50 is provided so that, for example, a threaded fastener or the like could occupy in part the slot so as to limit linear travel of actuator 50 with respect to sleeve 54. At the end portion of actuator 50 from disk 56 is provided a pair of conically shaped annular beveled surfaces 61, 62. Also provided is an opening 60 through which wireline 14 will pass. Note that opening 60 is elongated so that wireline 14 will be free to pass therethrough in either the position of FIG. 2 or FIG. 6 which are respectively released and engaged positions with respect to the slips. Slips 51, 52 are best seen in FIGS. 3 through 5 and FIG. 6. FIGS. 3 through 5 show that each slip 51, 52 has an elongated line grabbing surface 55. Surfaces 55 on each slip cooperate to compress line 14 when slips 51, 52 are depressed by ram 50. Recess 90 allows pins 84 to penetrate each slip 51, 52 registering it with springs SPR. The diagonal slit (unnumbered) in FIG. 5 on slips 51, 52 is an optional feature which would cooperate with a pin or set screw on slip carrier 80, to assist in alignment of slips 51, 52 during travel between engaged (FIG. 6) and disengaged (FIG. 2) positions.

Figure 11:
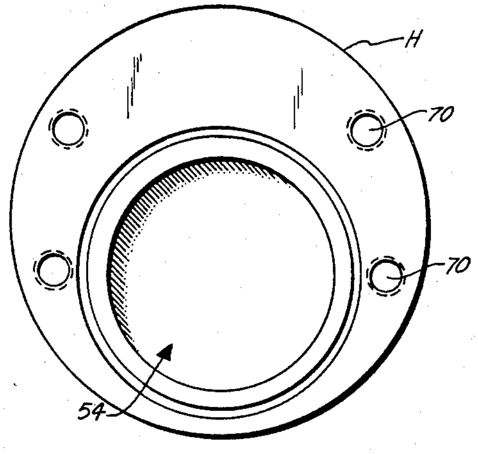
FIG. 11 is a partial view of the preferred embodiment of the apparatus of the present invention including a portion of the slip ram housing.
Figure 12:
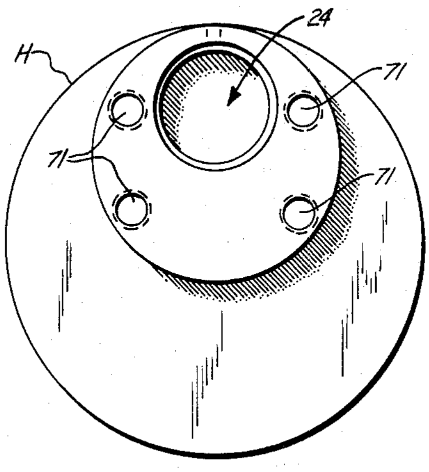
FIG. 12 is an end view of the trigger rod housing portion of the preferred embodiment of the apparatus of the present invention.

FIGS. 2, 11 and 12 show housing H and also the annular sleeve portions thereof which are receptive respectively of the annular disk 56 of actuator 50 and the plurality of annular ribs 35–37 of shaft 34. In FIG. 11, housing H provides an enlarged annular opening 54 which would be preferably cylindrical and of an inner diameter which is uniform and receptive of disk 56. During operation disk 56 would move linerally along an axis coincident with the central axis of sleeve 54.

Similarly, FIG. 12 shows an end view of the cylindrical sleeve bore 24 which is also seen in FIG. 2. During operation sleeve 24 provides a cylindrical bore of uniform diameter substantially equal to the diameter of ribs 35–37 as shown in FIGS. 9 and 10. Shaft 34 moves linearly within the sleeve 24 as aforementioned, the ribs 35–37 and their O-rings forming a seal with the sleeve 24. Openings 70 in housing H and openings 71 in housing 12 are openings for the placement of bolts or like such fasteners which are not shown in the drawing but which would be used to assembly the entire housing H together as in FIGS. 1 and 2.

Figure 13:
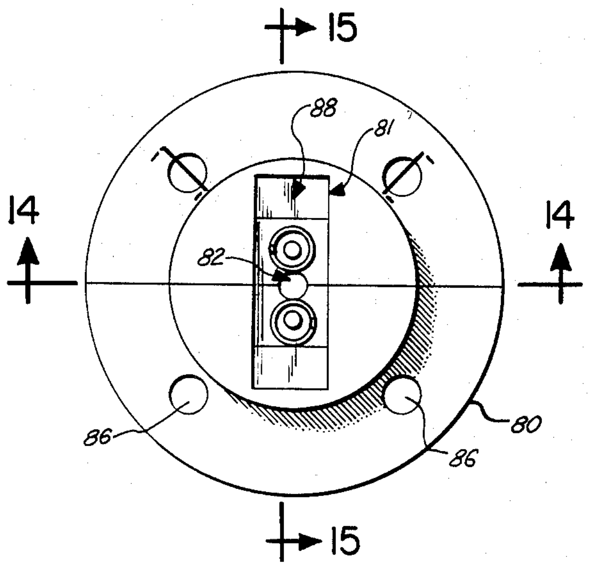
FIG. 13 is a top view of the body portion of the preferred embodiment of the apparatus of the present invention illustrating the slips.
Figure 14:
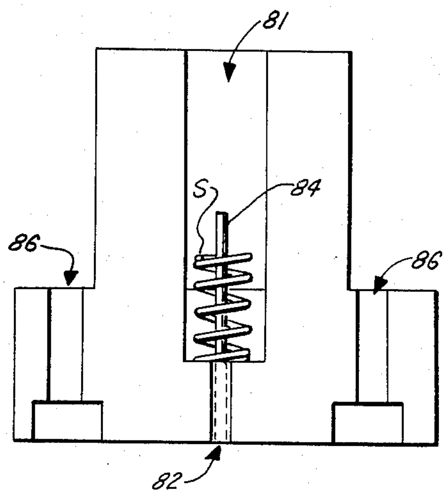
FIG. 14 is a sectional view taken along lines 14—14 of FIG. 13.
Figure 15:
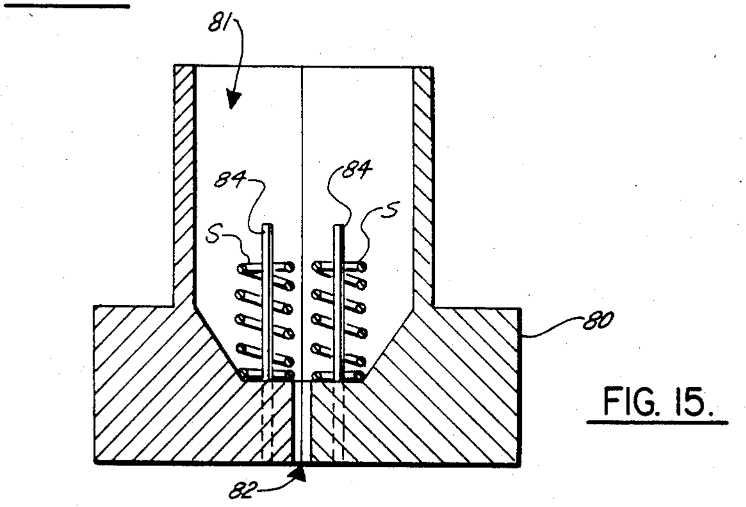
FIG. 15 is a sectional view taken along lines 15—15 of FIG. 13.

FIGS. 13 and 14 show slip carrier 80. Slip carrier 80 provides a slip opening 81 receptive of slips 51, 52. A plurality of openings 86 are provided for bolts or like such fasteners which would attach slip carrier 80 to housing 12 at the slip carrier support 13 portion thereof. FIG. 2 and FIG. 6 show slip carrier 80 in its operating position. Slip carrier support 13 would be a machined block which would be bolted or attached in like manner to housing 12.

A central opening 82 would allow wireline 14 to pass through slip carrier 13. A pair of pins 84 as shown in FIG. 13 provide a place for the positioning of springs SPR which will, in part, actuate each slip. Pins 84 also penetrate recesses 90 of slips 51, 52.

FIGS. 2 and 6 show more particularly the placement and operation of springs SPR. Note that each spring SPR is placed upon a pin 84.

The operation of wireline catcher 10 after a break or any other decrease in tension of wireline 14 is best seen in FIG. 6. Note that responsive to a break or any other decrease in tension of wireline, shaft 34 shifts to a position which moves it to an innermost position defined by limit slot 40 of shaft 34. This opens port 32 which allows pneumatic fluid to enter the space S between ribs 36 and 37. This pressurizes the area behind disk 56 which is schematically illustrated by the curved arrows 100 in FIG. 6. Arrow 90 shows the movement of actuator 50 to the engaged position. This causes surfaces 61, 62 to bear against the uppermost inclined surfaces 66, 68 of the slips 51, 52. Thus the slips are pressed downwardly and overcome the biasing effect of springs SPR, compressing these springs. Inclined surfaces 88 are provided on slip carrier 80 so that as slips 50, 51 are pressed downwardly they move the surfaces 55 inwardly so as to compress wireline 14 and grip it preventing its further downward movement into the well bore. This final gripping position is best seen in FIG. 6. Threaded member 76 can be used to adjustably limit or stop lateral movement of actuator 50 as desired.

Apparatus 10 can be constructed of any durable high strength material, preferably a metal which can be machined such as steel or stainless steel. O-rings shown occupying recesses 38 and 57 could be conventional O-ring material such as neoprene, for example.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An oil well wireline cable catcher apparatus comprising:

a. a housing having a bore which passes vertically therethrough so that a wireline to be caught can pass vertically therethrough and then into the oil well bore;

b. sensing means for monitoring tension of the wireline, so that a break in the wireline can be detected;

c. a pair of slip surfaces disposed within the housing on opposite sides of the wireline at least one of which is movable between gripping and retracted positions, the pair of respective surfaces facing one another so as to grip the wireline in the gripping position;

d. spring means mounted in the housing for biasing at least one of the slip surfaces toward the retracted position in which the wireline is not engaged by the slip surfaces; and e. slip actuator means carried by the housing and cooperatively connected to the sensing means for moving at least one of the slip surfaces relative to the other slip surface responsive to a break in the wireline, including a powered shaft carrying at one end portion thereof means for urging the two slip surfaces together.

2. The oil well wireline cable catcher apparatus of claim 1, wherein the powered shaft is generally perpendicularly positioned with respect to the pair of slip surfaces.

3. The oil well wireline cable catcher apparatus of claim 1, wherein the slip surfaces are disposed upon a pair of slips which are independently movable with respect to each other.

4. An oil well wireline cable catcher apparatus comprising:

a. a housing having a bore which passes vertically therethrough so that a wireline to be caught can pass vertically therethrough and then into the oil well bore;

b. sensing means to monitor tension of the wireline;

c. a pair of slips disposed within the housing on opposite side of the wireline between gripping and retracted position, each slip having a wireline engaging surface, the pair of respective surfaces facing one another so as to grip the wireline when the slips are actuated to the gripping position;

d. a pair of springs mounted in the housing and respectively beneath each slip, the springs biasing the slips toward the retracted position so that the wireline is not engaged by the slip surfaces;

e. slip actuator means carried by the housing and cooperatively connected to the sensing means for moving the slips together to grip the wireline responsive to a break in the wireline and attentive relaxation in wireline tension, further comprising a shaft carrying at one end portion thereof a pair of beveled surfaces angularly placed with respect to the slips, lateral movement in one direction of the shaft causing the slips to move toward the gripping position.

5. The apparatus of claim 4, wherein the slip actuator means comprises a shaft carried in the housing within a sleeve, and further comprising attachment means for supplying pneumatic fluid under pressure to the sleeve.

6. An oil well wireline cable catcher apparatus comprising:

a. a housing having a bore which passes vertically therethrough so that a wireline to be caught can pass vertically therethrough and then into the oil well bore;

b. sensing means to monitor the wireline comprising:

i. a sheave engaging the wireline;

ii. a trigger shaft assembly attached at one end to the sleeve and at the other being disposed within the housing;

iii. a sleeve surrounding one end portion of the trigger shaft and forming a seal with the middle portion thereof;

c. a pair of slips disposed within the housing on opposite sides of the wireline between gripping and retracted positions, each slip having a wireline engaging surface, the pair of respective surfaces facing one another so as to grip the wireline when the slips are actuated to the gripping position;

d. a pair of springs mounted in the housing and respectively beneath each slip, the springs biasing the slips toward the retracted position so that the wireline is not engaged by the slip surfaces; and e. slip actuator means carried by the housing and cooperatively connected to the sensing means for moving the slips together to grip the wireline responsive to a break in the wireline and attentive relaxation in wireline tension.

* * * * *